United States Patent [19]
McArthur et al.

[11] Patent Number: 5,435,646
[45] Date of Patent: Jul. 25, 1995

[54] TEMPERATURE MEASUREMENT USING ION IMPLANTED WAFERS

[75] Inventors: Warren F. McArthur, Solana Beach; Fred C. Session, Cardiff, both of Calif.

[73] Assignee: Hughes Aircraft Company, Los Angeles, Calif.

[21] Appl. No.: 149,600

[22] Filed: Nov. 9, 1993

[51] Int. Cl.⁶ .............................................. G01K 7/16
[52] U.S. Cl. ..................................... 374/185; 338/25; 374/183; 374/178
[58] Field of Search ................... 374/178, 185, 1, 183; 257/467; 338/22 SD, 25

[56] References Cited

U.S. PATENT DOCUMENTS

| | | | |
|---|---|---|---|
| 4,640,629 | 2/1987 | Antonini et al. | 374/178 |
| 4,739,258 | 4/1988 | Schwarz | 374/57 |
| 4,764,026 | 8/1988 | Powell et al. | 374/178 |
| 4,984,902 | 1/1991 | Crowley et al. | 374/1 |
| 5,114,242 | 5/1992 | Gat et al. | 374/128 |
| 5,141,334 | 8/1992 | Castles | 374/185 |

FOREIGN PATENT DOCUMENTS

| | | | |
|---|---|---|---|
| 2935308 | 3/1981 | Germany | 374/178 |
| 3146909 | 6/1983 | Germany | 374/178 |
| 0004317 | 2/1968 | Japan | 374/178 |
| 0602796 | 4/1978 | U.S.S.R. | 374/178 |
| 8707716 | 12/1987 | WIPO | 374/178 |

*Primary Examiner*—Diego F. F. Gutierrez
*Attorney, Agent, or Firm*—W. C. Schubert; W. K. Denson-Low

[57] ABSTRACT

The value of an unknown test temperature is measured by heating a test wafer (58) to the unknown temperature, measuring the surface electrical resistivity of the test wafer (58), and determining the value of the unknown temperature from the measured surface electrical resistivity. The test wafer (58) is prepared by providing an initial wafer (50), first ion implanting the initial wafer (50) with a first dose of an ionic species, and annealing the ion implanted initial wafer (50) at an annealing temperature. The preparation is completed by second ion implanting the annealed wafer with a second dose of the same ionic species as used in the first dose to form a test wafer, the second dose being lower than the first dose.

16 Claims, 3 Drawing Sheets

FIG. 3.
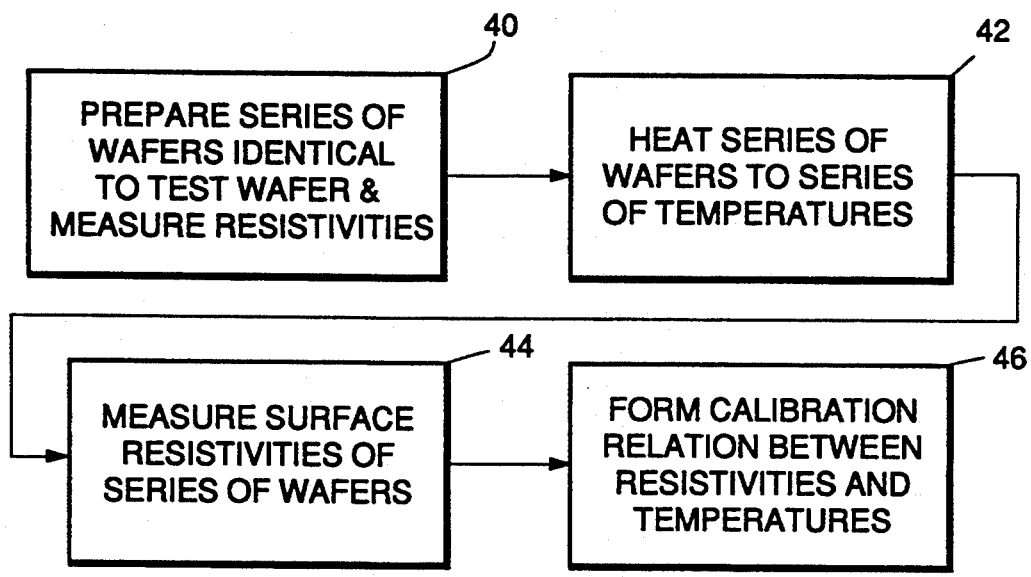
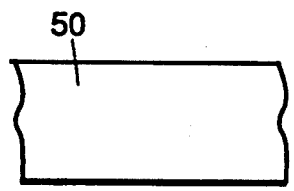
FIG. 4(a).
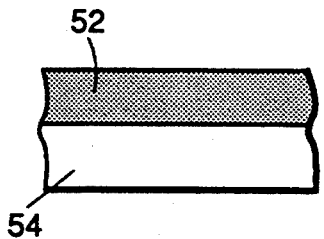
FIG. 4(b).
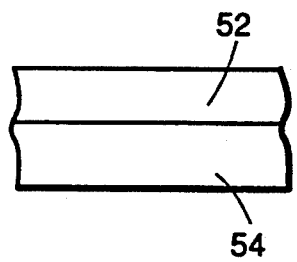
FIG. (4)c.
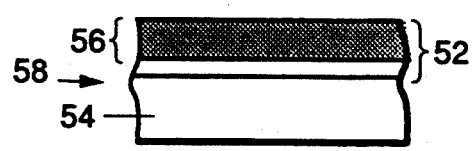
FIG. 4(d).
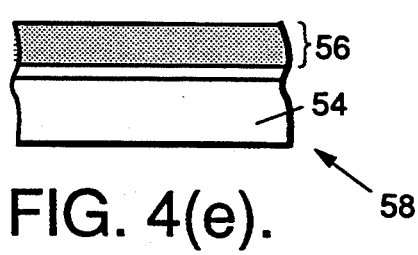
FIG. 4(e).

TEMPERATURE MEASUREMENT USING ION IMPLANTED WAFERS

BACKGROUND OF THE INVENTION

This invention relates to the measurement of temperatures, and, more particularly, to determining surface temperatures.

The temperature to which an article is heated during processing is often a critical factor in the final outcome and success of the processing. For example, when microelectronic devices are prepared, there are often numerous heat treatments for annealing, controlled interdiffusion, and other reasons. The properties of the final devices often depend on the temperatures reached during the various heat treatments. Great care is ordinarily taken to control the heating equipment so that the desired temperature is reached. However, the actual temperature reached is not known with certainty unless it is actually measured, because there may be equipment malfunctions, internal variations within a heated region, etc.

Temperatures are measured by a wide variety of techniques. Many of the most familiar techniques such as thermometers, thermocouples, pyrometers, temperature strips, and temperature marking crayons are not suitable for measuring the processing temperature reached in microelectronic device processing. In some instances the devices are so small that conventional measuring devices are of too gross a size to measure the local temperature of the processed device. In other instances the surface of the device is preferentially heated, as by plasma heating. A conventional temperature measurement method is not well suited for measuring the local surface temperature of the device heated in this manner, because the surface is preferentially heated. Temperature marking crayons may contaminate the surface of a sensitive semiconductor device, and therefore cannot be used in such applications.

There is a need for an improved approach to measuring the temperature of articles during processing, and particularly the surface temperatures achieved by surface-heating techniques. The present invention fulfills this need, and further provides related advantages.

SUMMARY OF THE INVENTION

The present invention provides an approach for measuring temperature based upon the effect of temperature upon the defect state of a test wafer. The technique is particularly suitable for conducting a measurement of the temperature reached during the processing of microelectronic devices. The technique can be implemented either directly as a temperature measurement region on the treated microelectronic device structure or on a separate wafer that is processed along with the microelectronic device structure. The technique may be used for sensing temperatures reached during bulk heat treatment, or surface temperatures reached during surface treatments, such as plasma heating.

In accordance with the invention, a method for measuring the value of an unknown test temperature comprising the steps of providing a doped test wafer having a short-range, unstable defect structure therein. The method further includes heating the test wafer to the unknown temperature, measuring the surface electrical resistivity of the test wafer, and determining the value of the unknown temperature from the measured surface electrical resistivity. In one preferred approach to preparing the test wafer, the method includes providing an initial single-crystal wafer, first doping the initial wafer with a first dose of a first ionic (doping) species, annealing the first doped initial wafer if the first doping caused damage to the lattice, and second doping the annealed wafer by ion implanting the annealed wafer with a second dose of a second ionic species, the second dose being lower than the first dose. The test wafer may be physically a part of the device for which the unknown temperature is to be measured, or it may be a separate piece.

In a preferred embodiment, the test wafer is desirably prepared by providing an initial wafer made of a single crystal material, first ion implanting the initial wafer with a first dose of an ionic species, annealing the ion implanted initial wafer at an annealing temperature, and second ion implanting the annealed wafer with a second dose of the same ionic species as used in the first dose to form a test wafer. The second dose is at a lower dosage and at a lower implantation energy than the first dose. In this preferred approach, the initial wafer is doped with a general bulk-doping level of one dopant type (i.e., p-type or n-type), and the ion implanted species is the opposite dopant type implanted in a surface layer. The first implanting is desirably at a higher implantation voltage than the second implantation to achieve a deeper implantation. The second implanting is preferably at a much lower dose, most preferably at least two orders of magnitude lower, than the first implantation. Ion implantation may be by ion beam or plasma or other operable technique.

The value of the unknown temperature is conveniently determined by using a calibration approach. This calibration procedure desirably includes preparing a series of wafers identical to the test wafer, heating the series of wafers to a series of known temperatures, measuring the surface electrical resistivities of the series of wafers, and forming a calibration relation between the surface electrical resistivities of the series of wafers and their respective known temperatures. Once the calibration relation is known, the user of the test wafer finds the value of the unknown temperature from the measured surface electrical resistivity of the test wafer and the calibration relation.

The present invention also extends to a test kit by which unknown temperatures can be determined. Such a kit includes a test wafer prepared by the steps of providing an initial wafer, first ion implanting the initial wafer with a first dose of an ionic species, annealing the ion implanted initial wafer, and second ion implanting the annealed wafer with a second dose of the same ionic species as used in the first dose to form the test wafer, the second dose being lower than the first dose. The test kit further includes a calibration relation of surface electrical resistivity of the test wafer as a function of a temperature to which it is heated. The calibration relation is prepared by the provider of the kit using the approach discussed previously.

The present invention provides a temperature measurement technique and apparatus that is suited for measuring bulk temperatures but also surface temperatures. In the latter role, the approach satisfies a need for a direct, highly localized measurement that cannot be otherwise met. Other features and advantages of the present invention will be apparent from the following more detailed description of the preferred embodiment, taken in conjunction with the accompanying drawings, which illustrate, by way of example, the principles of the invention.

BRIEF DESCRIPTION OF THE DRAWINGS

FIG. 3 is a process flow diagram for the determination of the unknown temperature from its resistivity measurement;

FIG. 4(a)–FIG. 4(e) is a set of schematic diagrams of a test wafer at various stages of preparation and use in measuring temperature, wherein FIG. 4(a) shows an initial wafer, FIG. 4(b) is the initial wafer after the first implanting, FIG. 4(c) is the first implanted wafer after annealing, FIG. 4(d) is the annealed wafer after the second implanting (the test wafer), and FIG. 4(e) is the test wafer after heating to an unknown temperature;

DETAILED DESCRIPTION OF THE INVENTION

Figure 1:
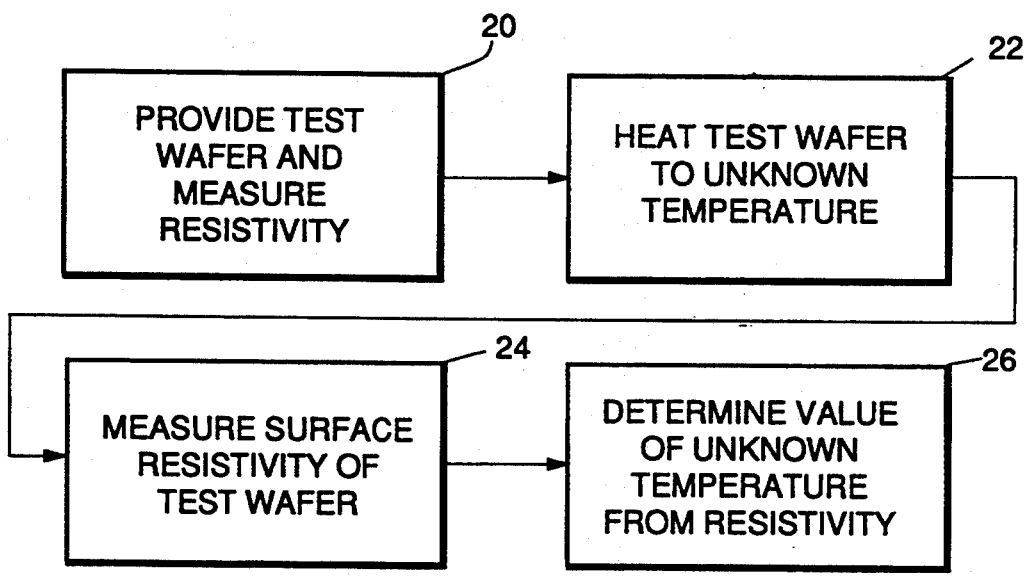
FIG. 1 is a process flow diagram for the practice of the invention.
Figure 2:
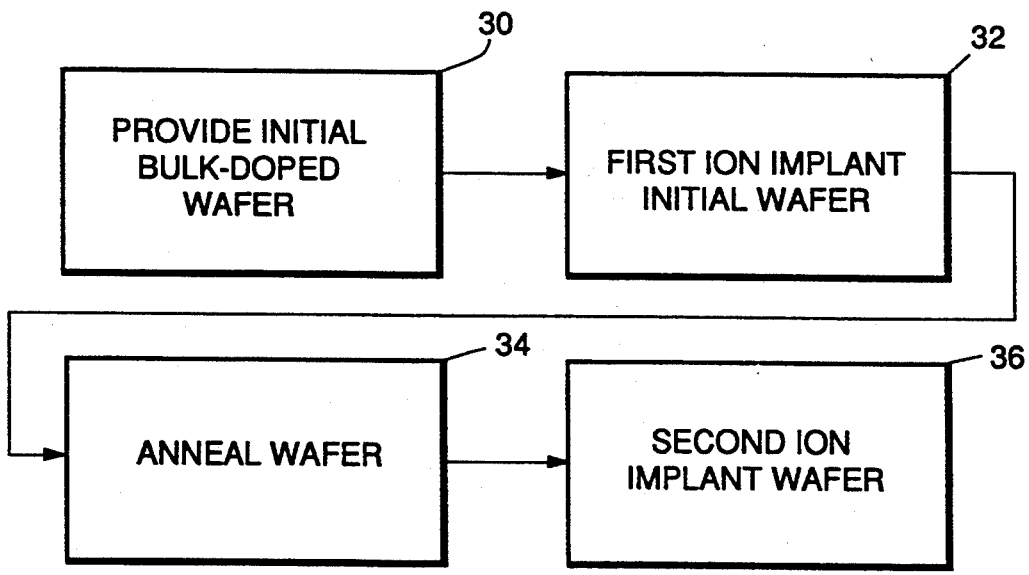
FIG. 2 is a process flow diagram for the preparation of a test wafer.

FIG. 1 is a flow diagram for the practice of the process of the invention. FIGS. 2 and 3 are flow diagrams for practicing preferred approaches to the steps of FIG. 1. FIG. 4(a)–FIG. 4(e) schematically depicts the test wafer at various stages of its preparation and use.

Referring to FIG. 1, a test wafer is first provided, numeral 20. The test wafer has a known electrical surface layer resistivity, or that surface layer resistivity may be measured using techniques to be discussed subsequently. The preferred procedure for preparing the test wafer is shown in FIG. 2. An initial wafer 50 (FIG. 4(a)) is first provided, numeral 30. The initial wafer 50 is preferably a single crystal that is bulk-doped with either an n-type or a p-type dopant. (As used here, the "type" of dopant means either n-type or p-type. In some instances an opposite type dopant is used, meaning a dopant of the opposite type from that already present.) The wafer may be, for example, single-crystal silicon, with a bulk doping of n-type phosphorus or p-type boron.

The initial wafer 50 is first doped by ion implantation, numeral 32, with a dopant of the opposite type from the bulk dopant of the initial wafer 50. That is, if the initial wafer 50 is doped with a p-type dopant, then an n-type dopant is used in the first ion implanting 32. If the initial wafer 50 is doped with an n-type dopant, then a p-type dopant is used in the first ion implanting 32. If the initial wafer 50 is substantially undoped, then either type dopant may be used in the first ion implanting 32. The first doping is preferably accomplished with an ion implantation technique such as ion beam implantation, but other operable doping techniques are also acceptable.

The preferred ion implantation deposits ions in a first surface layer 52, leaving a bulk region 54 of the bulk type doping. FIG. 4(b) schematically depicts the first ion implanted structure. The depth or thickness of the first surface layer 52 is dependent upon the species and energy of the implanted ions. In a typical case of implanting n-type phosphorus into silicon, a 100 Kev (thousand electron volt) implantation voltage produces a first surface layer 52 about 0.18 micrometers thick. The total dose of ions in the first ion implantation is at a moderate level, and is typically in the range of about $10^{13}$–$10^{15}$ ions per square centimeter. Ion implantation has two effects. First, it implants ions into the first surface layer 52. Second, it creates a defect structure in the first surface layer 52 due to the impacting of the energetic ions. The defect structure consists primarily of local defects of atoms displaced from their normal lattice positions.

After the first doping, as by ion implantation, the wafer is annealed, numeral 34, to remove the defect structure. The resulting wafer is depicted in FIG. 4(c), having a largely defect-free first surface layer 52 and a largely unchanged bulk region 54. The annealing treatment is conducted at a temperature sufficiently high, and for a sufficiently long time, to remove the defect structure but not cause extensive diffusion of the first ion implanted dopant into the bulk of the wafer. A typical annealing treatment for ion implanted silicon is 1000° C. for 30 minutes, in nitrogen gas.

Following annealing, the wafer is second doped, again preferably by ion implantation, numeral 36. The second ion implantation 36 preferably, but not necessarily, uses the same ion (dopant) type as the first ion implantation 32. The second ion implanting 36 differs from the first ion implantation 32 in at least one, and preferably two, important respects. The second ion implanting must be at a lower dose than the first ion implanting, is preferably at a much lower total dose than the first implanting, and is most preferably at least two orders of magnitude lower. For example, if the first ion implantation 32 has a total dose of $5 \times 10^{14}$ ions per square centimeter, the second ion implantation 36 is desirably at a dose of less than $5 \times 10^{12}$ ions per square centimeter. Second, preferably but not necessarily, the second ion implanting 36 is at a lower implantation energy than the first ion implanting 32. The lower implantation energy creates a second surface layer 56 that is thinner (less deep) than the first surface layer 52. The use of a lower implantation energy in the second ion implanting 36 ensures that this second dose of ions will reside entirely within the previously treated first surface layer 52. As an example, if the ion implantation energy of the first ion implantation is 100 Kev, the ion implantation energy of the second ion implantation is less than 100 Kev, such as about 80 Kev.

After the second ion implanting 36 is complete, the second surface layer 55 has a concentration slightly higher than that of the first surface layer 52 after the first ion implanting 32, because the second surface layer 56 has received the total doses of the first ion implanting and the second ion implanting. The difference is not large, because the second ion implanting dose is much less than that of the first ion implanting. The second surface layer 52 also has a defect structure after the second ion implanting. The defect structure is well defined in nature, and comprises primary local, short-range, unstable defects that can be removed by a small number of thermally activated solid state diffusional events, such as one or a few events. The defect structure is less concentrated (fewer defects per unit volume) after the second ion implanting than after the first ion implanting (but before the anneal 34), because the dose of the second ion implanting is lower and because its ion implantation energy is preferably lower.

The wafer that has been processed as depicted in FIG. 2 is termed the test wafer 58.

Returning to FIG. 1, the test wafer 58 is heated to some unknown temperature which is to be measured, numeral 22, that is less than the annealing temperature of step 34. The heating can be accomplished by heating the entire test wafer uniformly, as by placing it into a furnace, or by preferentially heating only the surface regions of the test wafer, as by plasma heating.

After heating to the unknown temperature, the electrical surface resistivity of the test wafer 58 is measured, numeral 24. Any operable resistivity measurement technique may be used. A four-point resistance probe is preferred. Such four-point resistance measurements are well known and widely used in other contexts.

The value of the unknown temperature to which the test wafer is heated is determined from the resistivity measurement, numeral 26, and, more specifically, from the change in resistivity. The determination is preferably made by a calibration procedure such as that depicted in FIG. 3. To perform the calibration procedure, a series of wafers are prepared identical to the test wafer, numeral 40, using the same process and values discussed in relation to FIG. 2. The wafers of the calibration series are heated to a series of known temperatures, preferably in a series of furnace heat treatments. That is, the first wafer of the series is heated to a first temperature, the second wafer to a second temperature, and so on. The individual electrical surface resistivities of the series of wafers are thereafter measured, numeral 44, preferably by the same procedure used in steps 40 and 24. A calibration relation is formed between the resistivities and temperature, numeral 46. To form the calibration relation, the difference between the surface resistivity of each wafer as measured in step 40 and as measured in step 44 is calculated. This difference is related to the temperature to which the wafer was heated in step 42.

Figure 5:
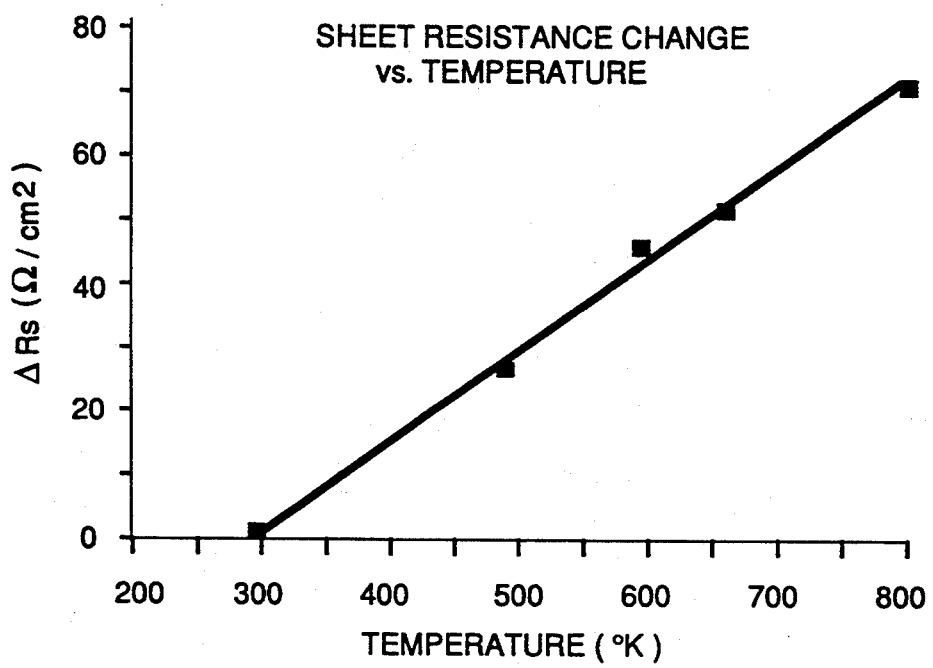
FIG. 5 is a graph of resistivity change as a function of temperature.

The most convenient way to express the calibration relationship is either with an equation or a graph. FIG. 5 is a graph of the resistivity difference as a function of the known temperature to which the wafer was heated. The relationship is linear, and is expressed by the indicated linear relationship. The information for FIG. 5 was developed in a reduction to practice of the invention to be discussed subsequently.

FIG. 5 demonstrates that there is a relationship between resistivity difference of the wafers before and after heating to a temperature. FIG. 5 is used in conjunction with the comparable resistivity difference measured for heating to the unknown temperature, steps 24 and 26. For the test wafer, the resistivity difference for resistivities measured before and after heating to the unknown temperature is calculated, and used with the relation of FIG. 5 to determine the unknown temperature.

Figure 6:
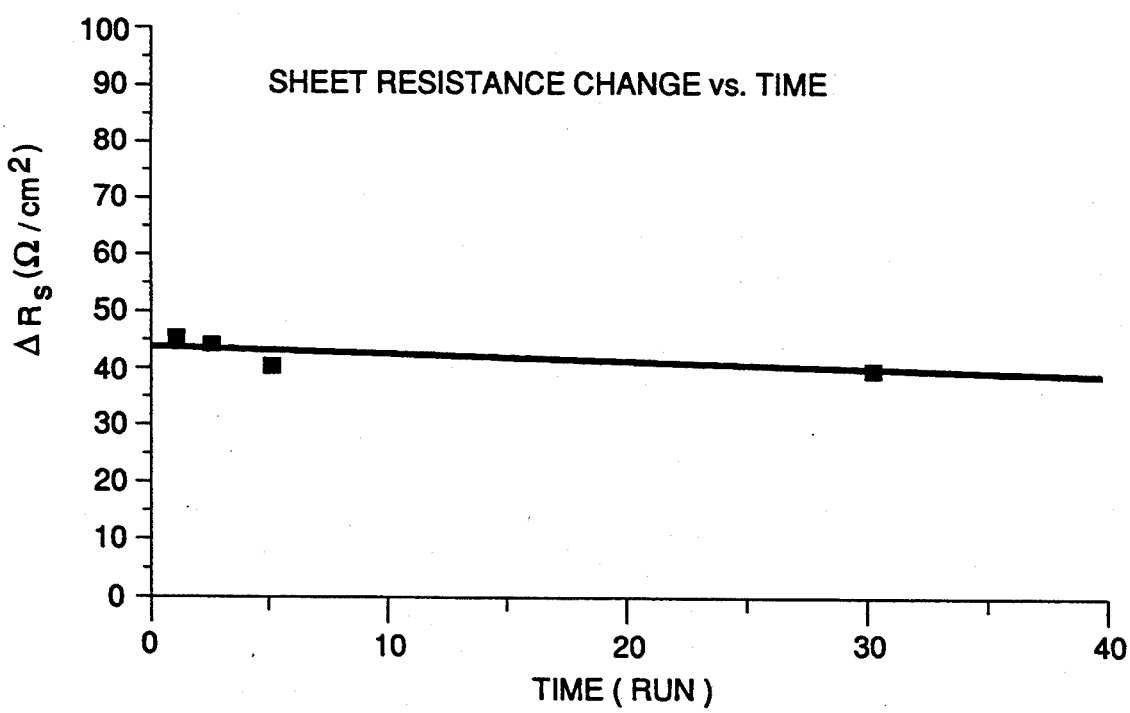
FIG. 6 is a graph of resistivity change as a function of time at constant temperature.

The temperature measurement of the present invention is based upon the removal of defects introduced during the second ion implantation, into a layer previously prepared by the first ion implantation and annealing. The removal of defects is generally a diffusionally controlled process, so there is the question of whether the approach measures solely temperature or some function of temperature and time. To verify that the measurement is for only the unknown temperature, a study was performed by heating a group of wafers to a temperature of 200 C. in a furnace and removing wafers one-by-one from the furnace at varying times. The resistivity difference was determined, and is plotted in FIG. 6 as a function of the time at temperature. Within the range of times studied, the resistivity difference is a very weak function of time. Thus, while the approach of the invention is not entirely independent of the time the wafer is maintained at the elevated temperature, it is nearly solely a function of temperature. This result is believed to be due to the short diffusional distances required to annihilate the point defects produced by the second ion implantation, when the wafer is heated to the elevated temperature.

The approach discussed herein can be performed in its entirety by a single user. Alternatively, the test wafers can be prepared by a vendor, along with the calibration relation for those wafers such as shown in FIG. 5. The vendor supplies the test wafers and the calibration relation as a test kit for use by customers. The customers need only measure the surface resistivity of the test wafer, heat the test wafer to an unknown temperature (as by placing the test wafer into the midst of a batch of microelectronic devices being processed), measure the surface resistivity after heating, and utilize the calibration relation. The first resistivity measurement of the test wafer could instead be performed by the vendor, but it is preferable that the customer do so, in order to negate any instrument errors that might arise due to the resistivity measurement apparatus.

The present invention has been practiced according to the preferred approach discussed herein. A test wafer and a series of calibration wafers were prepared. The initial wafers were in each case p-type silicon having a resistivity of greater than 100 ohm-cm. The first ion implantation 32 used phosphorus at a dose of $5 \times 10^{14}$ ions per square centimeter and an implantation voltage of 100 Kev. The annealing step 34 was at 1000° C. for 30 minutes in nitrogen gas. The second ion implantation 36 used phosphorus at a dose of $1 \times 10^{12}$ ions per square centimeter and an implantation voltage of 80 Kev. The surface resistivities of these test wafers were measured and found to be about 209 ohms per square. The calibration wafers were heated to a series of temperatures in a furnace between 200° C. and 500° C. for 1-30 minutes. The surface resistivities were measured, and the difference between surface resistivity before and after the heating to the known temperatures. The differences are plotted against temperature in FIG. 5 to depict the calibration relationship.

Test wafers from this batch were heated to unknown temperatures in a furnace. The surface resistivities after heating were measured, the difference in resistivities was calculated, and the calibration relation of FIG. 5 was used to determine the unknown temperature. The unknown temperatures were also verified by temperature strips and thermocouples. It is noted that these temperature verification techniques were used here to prove the operability of the present invention, because issues such as contamination of the wafer were not of importance. Such techniques are not acceptable for temperature measurement in many manufacturing situations, because they can contaminate the wafers or the vacuum system, or are unacceptable for other reasons.

Although a particular embodiment of the invention has been described in detail for purposes of illustration, various modifications may be made without departing from the spirit and scope of the invention. Accordingly, the invention is not to be limited except as by the appended claims.

What is claimed is:

1. A method for measuring the value of an unknown temperature, comprising the steps of:
   providing an initial wafer;
   first ion implanting the initial wafer with a first dose of an ionic species;

annealing the ion implanted initial wafer at an annealing temperature;

second ion implanting the annealed wafer with a second dose of the same ionic species as used in the first dose to form a test wafer, the second dose being lower than the first dose;

heating the wafer to the unknown temperature;

discontinuing the step of heating;

measuring the surface electrical resistivity of the test wafer after the step of discontinuing; and determining the value of the unknown temperature from the measured surface electrical resistivity.

2. The method of claim 1, wherein the initial wafer is doped with a first type dopant, and the ionic species is of an opposite type dopant.

3. The method of claim 1, wherein the step of first ion implanting includes the step of first implanting at a first energy and the step of second ion implanting includes the step of second implanting at a second energy, wherein the second energy is less than the first energy.

4. The method of claim 1, wherein the second dose is at least about two orders of magnitude smaller than the first dose.

5. The method of claim 1, wherein the ionic species is a p-type dopant.

6. The method of claim 1, wherein the ionic species is an n-type dopant.

7. The method of claim 1, wherein the step of determining the value of the unknown temperature includes the steps of preparing a series of wafers identical to the test wafer, heating the series of wafers to a series of known temperatures, measuring the surface electrical resistivities of the series of wafers, and forming a calibration relation between the surface electrical resistivities of the series of wafers and their respective known temperatures.

8. The method of claim 1, wherein the step of determining the value of the unknown temperature includes the step of finding the value of the unknown temperature from the measured surface electrical resistivity of the test wafer and a calibration relation.

9. The method of claim 1, wherein the test wafer has a microelectronic device structure therein in addition to the temperature measuring structure produced by the steps of first ion implanting, annealing, and second ion implanting.

10. A method for measuring the value of an unknown test temperature, comprising the steps of:

providing a doped test wafer having a short-range, unstable defect structure therein;

heating the test wafer to the unknown temperature;

discontinuing the step of heating;

measuring the surface electrical resistivity of the test wafer after the step of discontinuing; and determining the value of the unknown temperature from the measured surface electrical resistivity.

11. The method of claim 10, wherein the step of providing a doped test wafer includes the steps of providing an initial wafer, first doping the initial wafer with a first dose of a first ionic species, annealing the first doped initial wafer, and second doping the annealed wafer by ion implanting the annealed wafer with a second dose of a second ionic species, the second dose being lower than the first dose.

12. The method of claim 11, wherein the first ionic species and the second ionic species are the same ionic species.

13. The method of claim 12, wherein the step of first doping includes the step of first implanting at a first energy and the step of second doping includes the step of second implanting at a second energy, wherein the second energy is less than the first energy.

14. The method of claim 12, wherein the second dose is at least about two orders of magnitude smaller than the first dose.

15. The method of claim 10, wherein the step of providing a doped test wafer includes the steps of providing an initial wafer of a bulk-doped semiconductor material;

first ion implanting the initial wafer with a first dose of an ionic species of a dopant type opposite to that of the doped semiconductor material;

annealing the ion implanted initial wafer at an annealing temperature, and second ion implanting the annealed wafer with a second dose of the same ionic species as used in the first dose to form a test wafer, the second dose being lower than the first dose.

16. The method of claim 10, wherein the step of determining the value of the unknown temperature includes the steps of preparing a series of wafers identical to the test wafer, heating the series of wafers to a series of known temperatures, measuring the surface electrical resistivities of the series of wafers, forming a calibration relation between the surface electrical resistivities of the series of wafers and their respective known temperatures, and determining the unknown temperature the measured surface electrical resistivity of the test wafer and the calibration relation.

* * * * *